(12) United States Patent
Anderson

(10) Patent No.: US 11,816,708 B2
(45) Date of Patent: Nov. 14, 2023

(54) ELECTRONIC DATA REVIEW SESSION

(71) Applicant: rhythmhoüz, Inc., Las Vegas, NV (US)

(72) Inventor: Barton Anderson, Las Vegas, NV (US)

(73) Assignee: Rhythmhouz, Inc., Las Vegas, NV (US)

(*) Notice: Subject to any disclaimer, the term of this patent is extended or adjusted under 35 U.S.C. 154(b) by 288 days.

(21) Appl. No.: 17/118,220

(22) Filed: Dec. 10, 2020

(65) Prior Publication Data

US 2021/0182920 A1 Jun. 17, 2021

Related U.S. Application Data

(60) Provisional application No. 62/948,031, filed on Dec. 13, 2019.

(51) Int. Cl.
G06Q 30/0282 (2023.01)
G06Q 30/018 (2023.01)
G06Q 10/02 (2012.01)
H04L 67/306 (2022.01)
H04L 67/50 (2022.01)

(52) U.S. Cl.
CPC ......... *G06Q 30/0282* (2013.01); *G06Q 10/02* (2013.01); *G06Q 30/018* (2013.01); *H04L 67/306* (2013.01); *H04L 67/535* (2022.05)

(58) Field of Classification Search
CPC .... G06Q 30/0282; G06Q 50/01; G06Q 10/02; G06Q 30/018; H04L 67/306; H04L 67/535
See application file for complete search history.

(56) References Cited

U.S. PATENT DOCUMENTS

2013/0275506 A1* 10/2013 Warner ................. G06Q 10/10
709/204
2014/0316906 A1* 10/2014 Cioffi ................. G06Q 30/0204
705/14.73

(Continued)

OTHER PUBLICATIONS

Mourzenko, Arseni "When there is no API", Stack Exchange dated Jul. 13, 2013; available at: https://softwareengineering.stackexchange.com/questions/204726/when-there-is-no-api#:~:text=When%20there%20is%20no%20API%2C%20ask%20the%20owner%20of%20the,There%20is%20no%20API. (Year: 2013).*

(Continued)

*Primary Examiner* — Brendan S O'Shea
(74) *Attorney, Agent, or Firm* — Michael P. Fortkort, Esq.; Protorae Law PLLC

(57) ABSTRACT

An electronic data review session is conducted between a host and a user needing to review specific accurate performance data that assists in mitigating the risks in hiring a musical act or artist for a performance in their venue. An established agreement between the host and client that supports the sharing the artist's performance data, bi-directionally, through an electronic communication interface using protocols of the World Wide Web is established between the host and the client and provides the client with access to web pages which are displayed on the client's computer using a standard web browser. In response to client applied filters, a subset of relevant, accurate performance data is displayed on web pages and served by the host to the client that may include data that was provided by the client or other clients.

20 Claims, 10 Drawing Sheets

(56) References Cited

U.S. PATENT DOCUMENTS

| | | | | |
|---|---|---|---|---|
| 2016/0132905 A1* | 5/2016 | Richards | ............... | G06F 16/338 |
| | | | | 705/7.29 |
| 2018/0025371 A1* | 1/2018 | Perri | ...................... | G06Q 10/02 |
| | | | | 705/7.31 |
| 2020/0167699 A1* | 5/2020 | Cohen | ..................... | H04L 51/52 |
| 2021/0097630 A1* | 4/2021 | Whilby | ................. | G06F 16/587 |

OTHER PUBLICATIONS

Margounakis, Dimitrios, and Dionysios Politis. "The science of networking: New trends in music production, distribution and management." International Conference on Information Society (i-Society 2012). IEEE, 2012. (Year: 2012).*

Widran, Jonathan "Up Close: Gigtown" Music Connection, May 6, 2016; available at: https://www.musicconnection.com/up-close-gigtown/ (Year: 2016).*

* cited by examiner

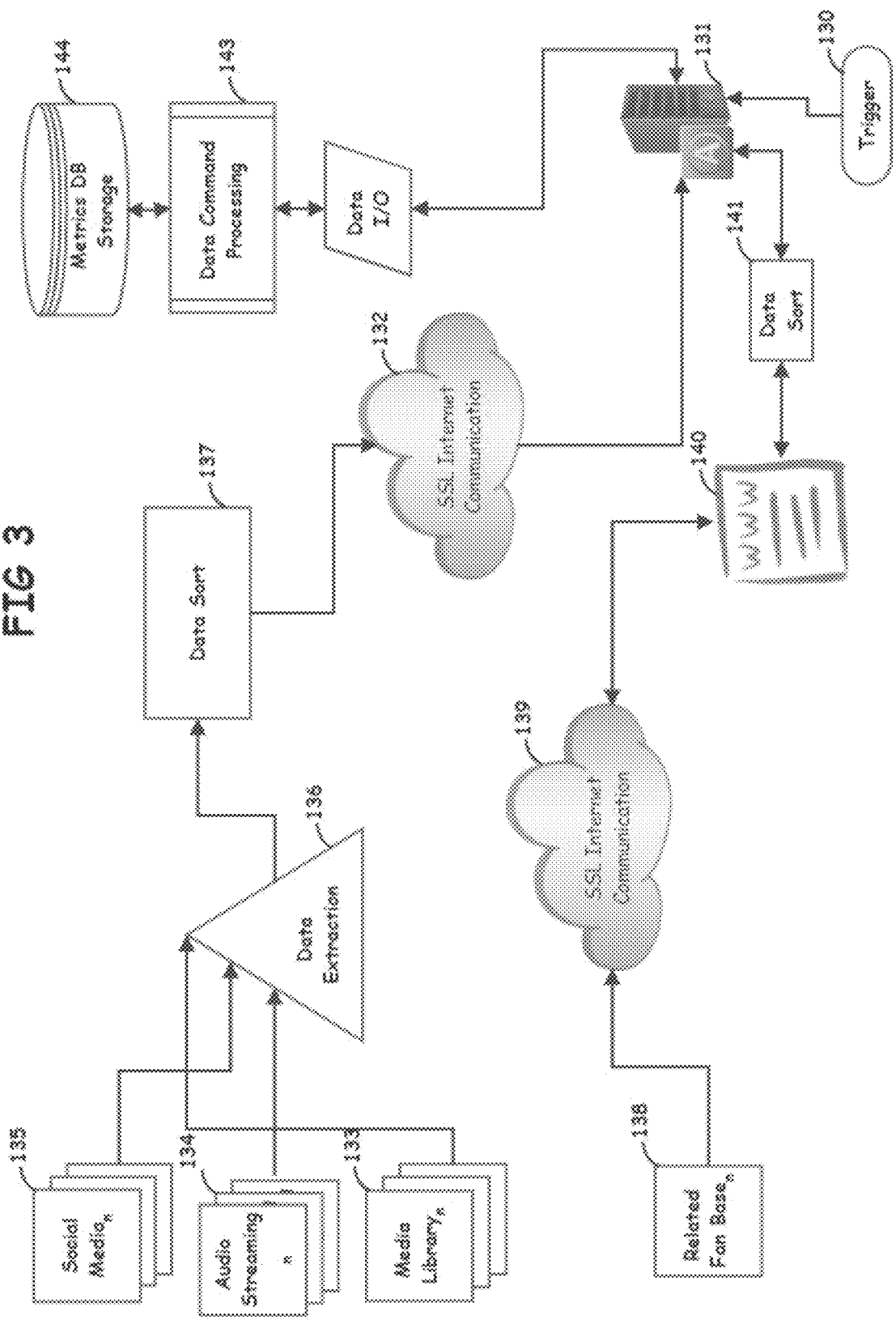

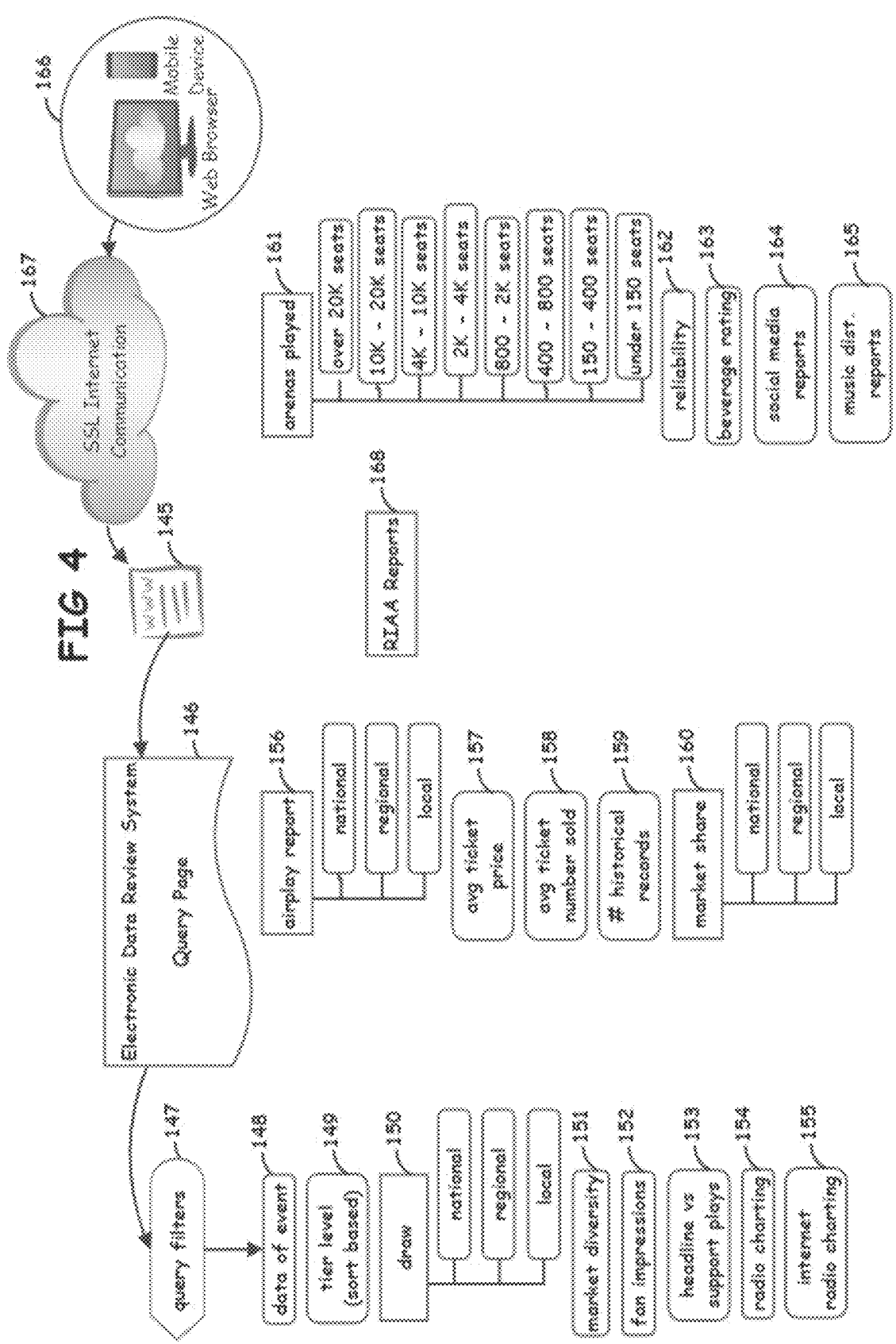

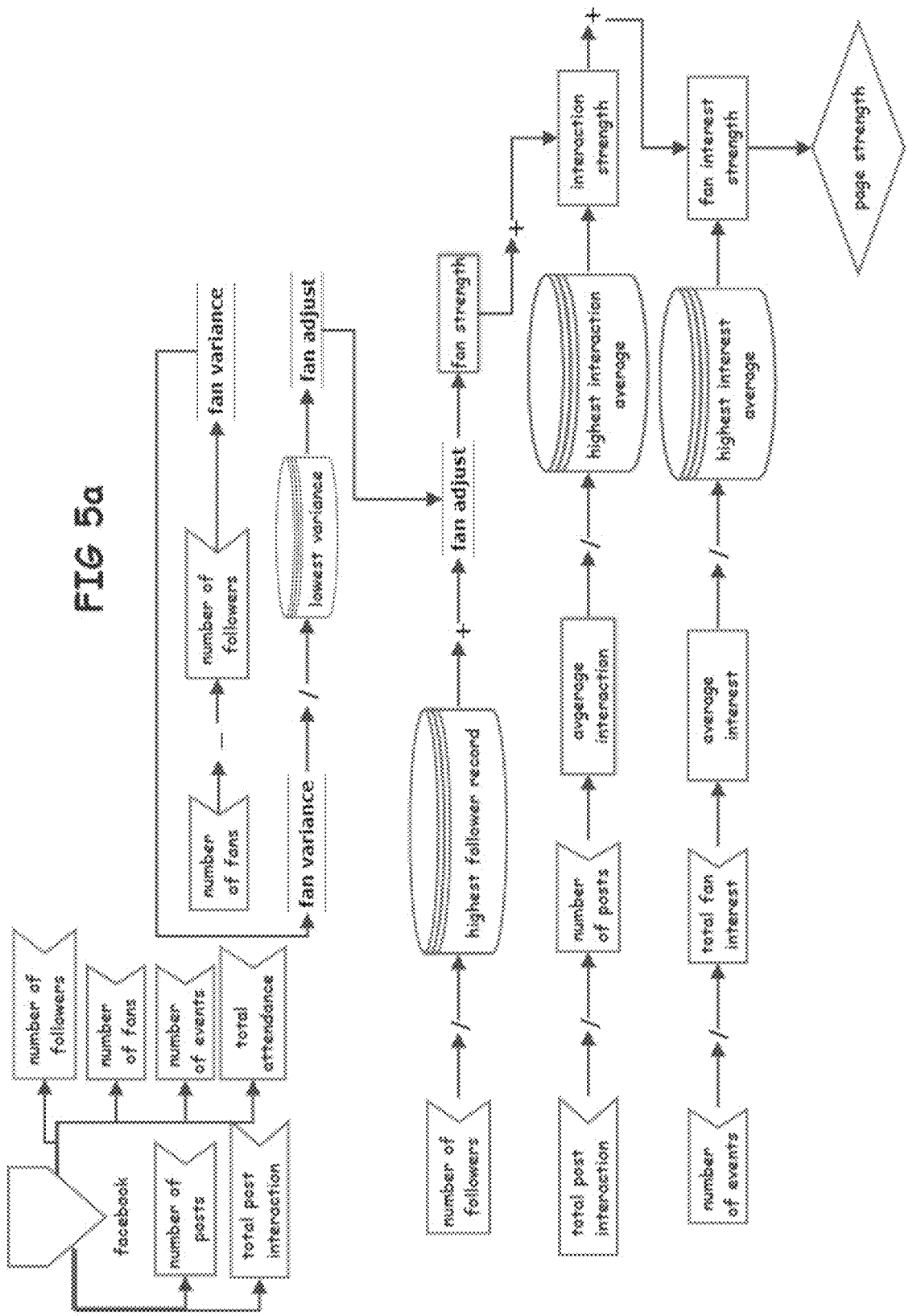

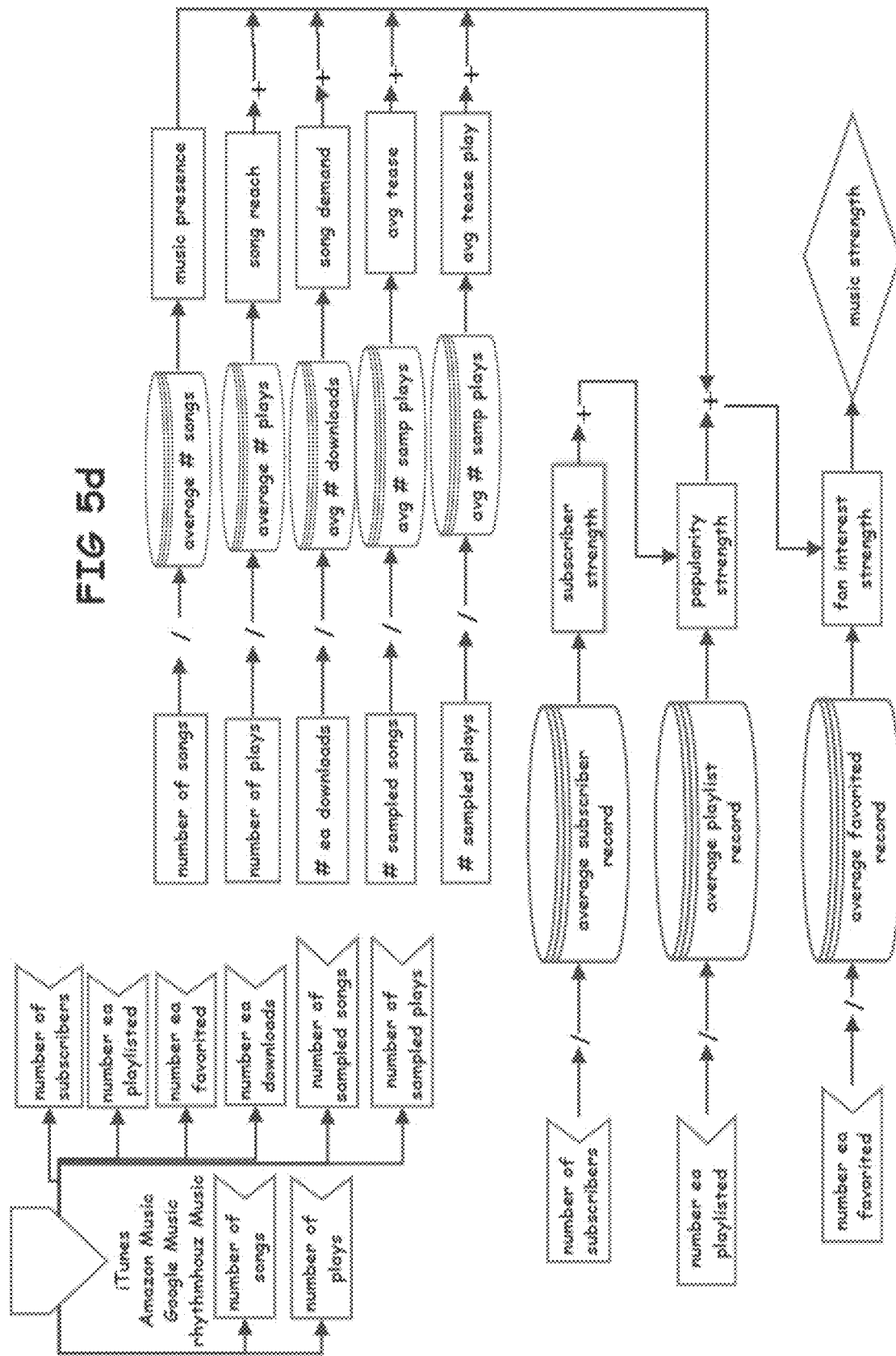

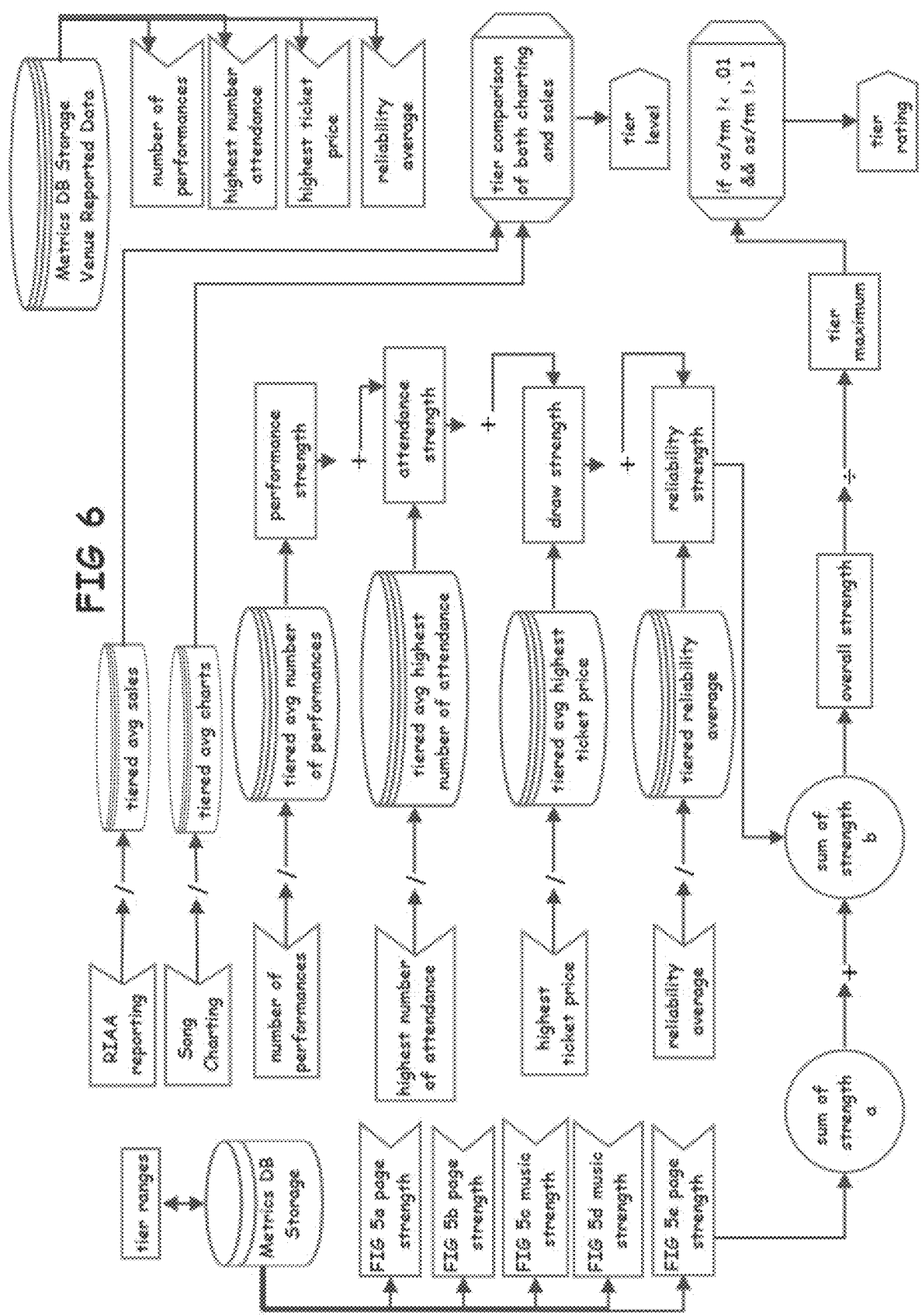

ELECTRONIC DATA REVIEW SESSION

BACKGROUND

The present invention relates generally to methods and apparatuses for interacting with users over a public network to create heretofore non-existent relationships between users and content providers, and more particularly to a method and apparatus for interacting with users over a public network, such as the Internet, to create heretofore non-existent relationships between users and content providers of music and music performances.

In the music industry, venues and concert halls of all sizes face an inability to accurately evaluate a band's performance for what the band will draw in attendance to their venue or concert hall if they hire the band to perform at their venue. A band's social media pages, websites and electronic press kits are almost always "over the top"—promoting the band as being much more than they are in terms of popularity, marketability, and draw, making it extremely difficult to determine accurate values for these metrics. Additionally, venues, concert halls, agents and promoters do not share performance related data with one another outside of their organization. For instance, Livenation™, Ticketmaster™, AXS™, and many others, have their own internal computer systems and databases that store each band's performance records (e.g. attendance, ticket sales, ticket sales by source, bar revenue, performance venue, other bands performed with, what role the band played (headline or support), etc. They do not share this data with any outside entity, making it impossible for any one of them to accurately review complete historical data from a band unless the band has performed solely on their stages.

The problem lies with the evaluation process. When a booker/buyer evaluates a new band for hire, the booker/buyer may examine the band's social media pages and website to determine the band's popularity, the number of fans that attended event at which the band performed, the social media interaction between the band and fans, and generally the self-marketing of the band. The booker/buyer will also review the band's electronic press kit (e.g., https://artistecard.com/crashmidnight#!/) to read reviews written by magazines, read the band's biography, watch videos and review any other data that will help in the evaluation of the band. As well, the booker/buyer may scour music distributers to review music sales, downloads and plays to get an idea of popularity and demand.

These methods of evaluation only provide a glimpse of what the band can bring to their venue in terms of attendance and remains far from accurate because there are no available methods to compare and calculate the data from each source to arrive at factual data that provides a clearer vision of the band's draw, reach, popularity and experience.

Without having prior experiences with the band performing at their venue and performance records available for those performances, the booker/buyer's risks to hire the band are very high and, aside from the rare one offs, the venue often winds up becoming unprofitable on high risk investments (as it costs money to staff for a performance, use utilities, clean, etc..), such as hiring a band without having accurate historical data and accurate fan related data during the booker/buyer's evaluation.

SUMMARY OF THE INVENTION

The present invention solves these and other problems by presenting a service that aggregates data from partnering venues and concert halls, agents and promoters, as well as aggregating and evaluating metrics and other data from social media, music distributers and web sources. The aggregated data is presented in an accurate manner of logical display to each of the partnering venues, concert halls, agents and promoters to provide for accurate evaluation of an act or artist.

As used herein, the term "artist" refers to one or more persons, individuals, musicians, bands, groups, first time performers, robots, animals, or anyone or anything creating art. Performance artists could include solo artists, duets, groups of artists, bands, groups, acts, crowds or any sized performing entity, including non-human entities. In general, the present invention applies to anything that can be hired to perform either at a traditional venue, such as a concert hall, or at any other place, such as malls, stores, offices, homes, to name only a few.

There are several processes provided herein to obtain accurate data to mitigate the risks described above. According to one aspect of the present invention, an exemplary embodiment of the present invention aggregates data from a band's social media accounts (e.g., Facebook®, Instagram™, Twitter™, etc.) using an appropriate application programming interface (API) as provided by a social media provider, as well as scraping data from the social media pages on a platform where data is required but not provided by an API. Data can be obtained using automated web bots or programs to automatically request data from these sites and then parse the data to obtain the desired information.

Data is collected through Facebook®'s API by obtaining data access to and from a band's Facebook® page, which data includes one or more of the following data items: number of fans, number of followers, interaction with fans on page, average number of page fans who attend their events, music plays by fans and non-fans, music sales/downloads, video views by fans and non-fans, unique hashtag usage (e.g. #wearethebest), page references used on Facebook® (e.g. @myband), total fan reach from page, and/or length of time since creating page.

Data is also collected through Instagram™'s API by obtaining data access to and from a band's Instagram™ page, which data also includes one or more of the following data items: number of fans, unique hashtag usage, number of posts, average number of likes per post, high and low number of likes, number of images posted, number of videos posted, and/or number of video click throughs.

Data is also collected through internal systems at rhythmhoüz™ from collected interactions by fans and industry professionals with the band's page, which data also includes one or more of the following data items: number of fans, number of posts, number of page likes, number of post likes, number of images and image likes, number of songs listed, song plays and song likes, number of videos listed, video plays and video likes, as well as other data relating to interaction with the bands applied features on the site.

The data collected from these two social media platforms, and others, is processed through algorithms to determine and validate actual fan potential reach and identified as page strength. After the social media processing, employing the algorithms set forth herein, the data is cross compared to quantify crossover fans from Facebook®. The amount of crossover fans are removed from the total fan reach numbers and are also removed from duplicate posts (e.g. when a Facebook® post and an Instagram™ post are identical) which further validate the reach and strength of the band's social media page.

Data collected from Soundcloud™ includes one or more of the following data: number of songs, number of plays, number of subscribers, number of each playlisted, and/or number of downloads (if downloads are offered).

Data collected from Spotify® includes one or more of the following data: number of songs, number of plays, number of subscribers, number of each sales/downloads, number of each playlisted, and/or number of songs favorited.

Data collected from iTunes® includes one or more of the following data: number of songs, number of plays, number of sampled songs and plays for each sample, number of each sales/downloads, number of songs favorited, and/or number of each playlisted.

Data collected from Amazon Music™ includes one or more of the following data: number of songs, number of plays, number of sampled songs and plays for each sample, number of each sales/downloads, number of songs favorited, and/or number of each playlisted.

Data collected from Google Music™ includes one or more of the following data: number of songs, number of plays, number of sampled songs and plays for each sample, number of each sales/downloads, number of songs favorited, and/or number of each playlisted.

Music data collected from rhythmhoüz™ includes one or more of the following data: number of songs, number of plays, number of sampled songs and plays for each sample, number of each sales/downloads, number of song likes, number of songs favorited, and/or number of each playlisted.

The present invention combines website scraped data with data obtained from available API's of social media platforms and with the aggregation of live and historical band performance data from the venues that hosted the performances. This combination has never existed and provides rich and fruitful data that can be used to mitigate the risks of hiring a band at a specific venue.

The present invention may employ automated web bots to perform data scraping of social media web sites. These bots can send interactive requests to web sites and then parse the data received from the web sites to obtain the information desired. These automated programs trace the directory structure of the site as well following links on the website. Data from social media sites is processed through algorithms described herein, the collection of which may be triggered by initial setup of a reference web page for an artist, band, musician, etc., and then once a week thereafter. Other triggers can be employed, such as on a scheduled time period or upon occurrence of a performance by such artist, band, musician, etc.

The present invention employs data access to venue computers via agreements between a host provider and a venue to obtain live and historical data by and between the venue and the host provider. Retrieving/collecting performance data from a venue is triggered by an event on a calendar created in the host provider's system when the venue booked an artist through the host provider system. Once established, these triggers initiate automatic collection of data from these venues without further human interaction.

Automated performance related data that is collected from a venue(s), may be triggered by one of the following methods. First, if the venue has an applications programming interface (API), an event on the host's digital event calendar triggers the automated data collection/retrieval system, accessing stored and live data through the venue's API. Predetermined data requests are automatically sent in response to an event trigger. Such requests to retrieve data include jQuery, AJAX, fetch or XMLHttpRequest GET/POST to request JSON, text or SQL data—depending on the stored data source.

Second, if the venue does not have an API, the host's event calendar will automatically send an email to the venue with a link to the web site where a data collection form exists for the venue to manually input the required data. Once the form is completed and sent to the host for processing, a notification is sent to the host's event calendar, removing the active trigger and preventing the triggers from repeating.

The host provider (e.g., rhythmhoüz) provides the venue access to:

1. A graphical and data driven database representation of musicians, acts, artists, bands, crew, stagehands, technical hands, promoters, record labels as both, interactive and promotional pages. This provides for the review of accurate aggregated data while searching for new talent to hire for performances, as well, as reviewing any of these entities or individuals, if they needed hiring any for whatsoever reason.

2. Historical records of band performance data as reported by venues and concert halls that may or may not be affiliated with their organization or company.

3. Accurate aggregated data (evaluated and validated data from social media, music distributers and combines it with performance data from venues to sum up an overall rating as well as verified data that is used to accurately assess a band for a performance). This data is presented on a brief data driven overview summary page for review by a booker/buyer. If the venue has interest in the band further, the booker/buyer can expand the data to evaluate further and even contact the band through the host provider network.

In return for access to the above data, the venue provides the host with authorized access to the venue's API which provides access to the venue's live and historical performance data and/or manually reported data from a performance—directly after the performance concludes.

By presenting all of the data a venue would manually review while evaluating a band, and in one place, and accurately processing that data to provide the venue with fully vetted, accurate aggregated data, the present invention provides a solution and service that mitigates the venue's risks involved with hiring a band to perform at their venue. A solution that no other has ever done.

The present invention yields an industry-unique method of collecting third party data related to an artist's or act's performance data. This proprietary data is assembled with a combination of artist's social media data and data related to music sales, downloads, plays and measured fan interaction. The resulting data is then offered to promoters, bookers/buyers, music halls and venues of all sizes, as accurate aggregated, to mitigate their risks involved with hiring an artist or act to perform on their stage. As well, the same data is offered to the individual or act it represents, to allow for educated decisions regarding the improvement of their marketability and footprint in the industry.

In some embodiments, third party data is collected by two methods. Medium to large sized venues or concert/music halls tend to have backend systems to track ticket sales (where the tickets were sold and number), live scanned tickets (at entrance) and bar sales. These numbers typically get presented, live, to the promoter(s) and booker/buyer of the event through an API. The present invention employs an electronic access to this data through their API.

Alternatively, manual input is obtained from the venue, promoter, booker/buyer containing the above data, a review/rating of the performance (1-10 stars based on certain criteria) and a rating of interaction with the house (1-10).

Information regarding media outlets, fan popularity and fan interaction are collected from several social or music networks, such as Facebook®, Instagram®, Soundcloud™, Spotify™ iTunes®, Amazon Music™, rhythmhoüz™, and Google Music™ to name only a few.

For example, data collected from a Facebook® page includes one or more of the following data: number of fans, number of followers, interaction with fans on page, average number of page fans who attend their events, music plays by fans and non-fans, music sales/downloads, video views by fans and non-fans, unique hashtag usage (#wearethebest), page references used on FaceBook® (@myband), total reach from page, and/or length of time since creating page.

For example, data collected from Instagram™ includes one or more of the following data: number of fans, number of crossover fans from Facebook™, unique hashtag usage (if different from Facebook®), number of posts, average number of likes per post, high and low number of likes, number of images posted, number of videos posted, and/or number of video click throughs.

For example, data collected from rhythmhoüz™ includes one or more of the following data: number of fans, number of industry likes, number of posts, average number of likes per post, high and low number of likes, number of images posted, number of songs posted, number of sampled songs and plays for each sample, number of song plays, number of each song playlisted, number of song sales/downloads (if offered), number of videos posted, and/or number of video likes.

For example, data collected from Soundcloud™ includes one or more of the following data: number of songs, number of plays, number of subscribers, number of each playlisted, and/or number of downloads (if downloads are offered).

For example, data collected from Spotify® includes one or more of the following data: number of songs, number of plays, number of subscribers, number of each sales/downloads, number of each playlisted, and/or number of favorited.

For example, data collected from iTunes® includes one or more of the following data: number of songs, number of plays (freemium subscription), number of sampled songs and plays for each sample, number of each sales/downloads, number of favorited, and/or number of each playlisted.

For example, data collected from Amazon Music™ includes one or more of the following data: number of songs, number of plays (freemium subscription), number of sampled songs and plays for each sample, number of each sales/downloads, number of favorited, and/or number of each playlisted.

For example, data collected from Google Music™ includes one or more of the following data: number of songs, number of plays (freemium subscription), number of sampled songs and plays for each sample, number of each sales/downloads, number of favorited, and/or number of each playlisted.

Other metrics can be obtained from these sites without departing from the scope of the present invention.

The above collected data is sorted and processed through an algorithm to determine several key factors of the artist/musician's marketability and then assigned different rankings and ratings, such as overall ranking value and number, expected fan draw and overall marketability.

Each of these metrics are broken down for the user (artist or act) they affect, so they can evaluate and learn how to improve their scores. These metrics and rankings are presented to the booking agents (venues/houses/promoters/etc.) for evaluation prior to booking (mitigating risks by using services set forth herein).

The present invention provides an Electronic Data Review (EDR) session that is conducted between a host and an organization needing to mitigate the risks associated with booking an artist or an act to perform at a venue. A contract providing access to the aggregated data presented in the EDR session is established between a host and the user's organization prior to providing access to an EDR session. A secure communications link is established between the host and the user, and in response to the user's query, a presentation of accurate aggregated data is provided by the host to the user that includes accurate data from third party sources, such as metrics from social media and data that is derived through the use of proprietary algorithms. The contract between the host and organization defines actions that must be completed by the organization, including reporting to the host the accurate data from an artist or act's performance at their venue, for storage in the host's database and inclusion in future queries by both the reporting organization and other organizations. A secure communications link is established between the host and the organizations' Application Programming Interface (API), which allows access to metrics data from related performances based on performances booked through the host for automatic data reporting. A secure communications link is established between the organization and the host's web services for the organization to manually report the metrics data to the host in the event additional information (other than what is automatically reported) is being reported to host and/or in the event no API is available.

In preferred embodiments of the invention, using secure protocols of the World Wide Web, an EDR session is established between the host and the user. The user is served with web-documents e.g., Hypertext Markup Language (HTML) documents, forming an interactive online metrics reporting session, which is presented on the user's computer using a standard web browser.

In alternate embodiments of the invention, using secure communication protocols of mobile applications, an EDR session is established between the host and the user. The mobile app serves the user with an interactive online metrics reporting session, which is presented on the user's mobile device.

Employing a web browser or mobile app for reporting to the host, users interactively navigate menus and/or web documents in the online reporting system, whether an HTML, form-based or mobile app system. Users report corresponding metrics and summaries from the artist's or act's performance in appropriate sections of the form(s) and submit/send the data to the host by selecting the appropriate button or action in the form after completing the form(s).

Employing the web browser or mobile app to search the host's database for artists and acts, users interactively navigate menus and web documents to get to an online query system, an HTML form-based or mobile app system which returns, relevant to the query, accurate aggregated data, metrics and custom metrics to the user's display. Users may select the act or artist to further review other content provided by the act or artist and may also contact the act or artist for discussions about bookings and inevitably book the act or artist through another module in the system.

Users may select from variable query parameters, such as specific date availability, tier level, draw based on national/regional or local, market diversity, fan impressions, acts opened for, headline vs support, charting, airplay reports, reliability, average ticket price, average ticket number sold, number of historical records, and the like as displayed by the web browser or mobile app. Other metrics are presented to the user based on the availability of these metrics and the level of history the artist or act may have stored in the host's records and databases. Selected query parameters present available acts to the user's web browser and mobile app's display where the user can select and browse acts, or filter the database response further by selecting additional parameters.

The host's mobile app may be accessed throughout the united states while the host's website may be accessed by users around the world and thus provides the host's contracted entities with a secure, centrally and continually managed and updated, single point-of-reference for mitigating the risks associated with hiring an act or artist for a performance at a venue. This feature provides a one stop risk mitigation center for hiring acts and artists instead of spending countless hours inaccurately evaluating and sourcing the difficult to validate, pieces and crumbs of data that the user can find singularly, on other websites.

The host's database provides additional advantages. The online database is continually updated by internal sources as manually reported metrics are validated, as well as the automated input by contracted organizations, which provides for the most current data available to all users. The advantages of the host's web code and mobile app interfaces are particularly realized in fast-evolving industries allowing for key service and code upgrades to products such as information technology.

The EDR session portal is positioned as a "premiere information source" by virtue of its ability to present and validate metrics from many sources, custom tailor reported metrics, derive value metrics through algorithms and present historical data to the requirements of the contracted organization's user. Thus, the burden of sourcing data, selecting acts and artists, and managing the risk of hiring acts and artists is lifted from the contracted organization allowing them to optimize their time and maximize their profits. By ensuring data reporting from performances by all venues, organizations and promoters in accordance with their contract terms; constant data collection and validation of data from social networks and other music industry sources; and deriving proprietary, high value metrics from other metric data values through proprietary algorithms, EDR effectively eliminates the fragmentation and the lack of accurate aggregated data available which drives up costs from unmitigated risks in hiring acts and artists for performances. The host's contracted partners can reduce or minimize risks altogether from hiring acts or artists to support a wider view of available acts and artists because of the accurate aggregated data in the EDR and by using the features and advantages provided by the EDR.

According to one aspect of the present invention, an exemplary embodiment of an apparatus provides an electronic data review session for review of information regarding performance artists by performance artist evaluators. According to another aspect of the present invention, the information has been aggregated, validated and summarized so that the performance evaluators can effectively evaluate any of the performance artists before hiring them. This enables the evaluators to mitigate any risks in hiring any of the performance artists. In this exemplary embodiment, the apparatus includes a host server for communicating with user computers, social media web servers, and performance venue computers. Each of the user computers employs a web browser to display information to the user, which browser is operating on the user computer. The apparatus also includes a database storing information regarding performance artists, and in combination with the host server serves up interactive web pages to the user computers in response to queries from the browsers regarding performance artists. Each interactive web page including information about one performance artist. The database and server interact with the browser being executed on the user computer to display the interactive web pages to enable a user to search for new talent to hire for a performance at a given performance venue or venues. The database and server combination provide a reference web page for each performance artist. The database and server combination enables a user to review details of any of the performance artists in the database, including contact information for these performance artists. The apparatus includes performance venue application programming interfaces (APIs) via which the server communicates with performance venue computers through which said server obtains live and historical performance data from performances at the performance venues. The database stores these historical records of performance artist performance data as reported by the performance venues via the performance venue APIs. The apparatus includes social media application programming interfaces (APIs) via which the server automatically obtains data regarding performance artists from social media servers. The apparatus includes web bots or automated programs to request data from the social media servers by sending requests, such as GET/POST requests, to the social media servers. The web bots then parse any received data from the social media servers to obtain predetermined information data sets. The apparatus also includes an automated data collection and retrieval system to access stored and live data through performance venue APIs by sending predetermined data requests to the performance venue APIs based upon certain predetermined conditions. The apparatus includes a digital event calendar storing events regarding performances at the performance venues. The digital event calendar also stores triggers to collect performance data related to the events. The apparatus includes a processor coupled to the database and server, which aggregates and validates data obtained via the social media APIs and the performance venue APIs to create an overall rating for each performance artist. The overall rating is displayed on the reference web page for each performance artist. The aforementioned apparatus may include other features and elements set forth in the present application and exclude some of the features set forth above.

In the above embodiment, the predetermined conditions may include the events stored on the digital event calendar. In this embodiment, an occurrence of a particular event at a particular performance venue stored in the digital event calendar creates a trigger, which causes the automated data collection and retrieval system to send a predetermined data request to a particular performance venue API related to the particular performance venue. These predetermined data requests may include: a jQuery, an AJAX, a fetch, and an XMLHttpRequest GET/POST to request JSON, text or SQL data. If a particular performance venue does not have a performance venue API when a particular trigger occurs, the digital event calendar automatically sends an email to the performance venue with a link to a predetermined website at which a data collection form can be downloaded so the particular performance venue can manually input any required data using the data collection form. Upon receipt of a completed data collection form for a particular performance event, the server sends a notification to the digital event calendar, which removes the particular trigger and prevents the particular trigger from repeating.

In this embodiment of an apparatus, the web bots are automatically triggered to send requests to the social media servers upon creation of a reference web page.

According to another aspect of the present invention, an exemplary embodiment of a computer implemented method provides an electronic data review session for review of information regarding performance artists by performance artist evaluators. According to the present invention, this information has been aggregated, validated and summarized so that the evaluators can effectively evaluate any performance artist before hiring the performance artist. This can significantly mitigate any risk in hiring a performance artist.

This exemplary embodiment of a computer implemented method includes communicating from a server with user computers. User computers could be performance evaluator computers. The computer implemented method also includes communicating from a server with social media web servers and performance venue computers, wherein each of the user computers can display information to each user via a browser operating on the user's computer. The computer implemented method further includes storing information in a database regarding performance artists, serving up interactive web pages to user computers in response to queries from browsers regarding the performance artists, and displaying on the interactive web pages information about the performance artists. The computer implemented method further includes interacting with browsers being executed on the user computers to display these interactive web pages to enable users to search for new talent to hire for performances at performance venues. The computer implemented method further includes providing a reference web page for each of said one or more performance artists and enabling a user to review details of any of the performance artists, including contact information. The computer implemented method further includes communicating via performance venue application programming interfaces (APIs) with performance venue computers to automatically obtain live and historical performance data from performances at the performance venues, and storing historical records of performance artist performance data as reported by the performance venue computers via the performance venue APIs. The computer implemented method further includes communicating via social media application programming interfaces (APIs) to automatically obtain data regarding said performance artists from social media servers, requesting by web bots, data from the social media websites by sending requests to the social media servers, and parsing received data by the web bots received from the social media servers to obtain a predetermined information data set. The computer implemented method further includes accessing stored and live data through the one or more performance venue APIs by sending predetermined data requests to the performance venue APIs based upon certain predetermined conditions, storing in a digital event calendar events regarding performances at the performance venues, storing triggers to collect performance data related to the events, aggregating and validating data obtained via the social media APIs and the performance venue APIs to create an overall rating for each of said one or more performance artists, and displaying the overall rating on the reference web page for each performance artist.

In this exemplary computer implemented method, a predetermined condition includes an event stored on the digital event calendar. Upon an occurrence of a particular event at a particular performance venue stored on the digital event calendar: one of the triggers is activated, which causes the automated data collection and retrieval system to send the predetermined data requests to a particular performance venue API related to the particular performance venue. If a performance venue does not have a performance venue API when a particular triggers is activated, an email is automatically sent to the performance venue with a link to a predetermined website at which a data collection form can be downloaded so the particular performance venue can manually input any required data using the data collection form. A notification is then sent, upon receipt of a completed data collection form for a particular performance event, to the digital event calendar, and the particular triggers is removed to prevent the particular trigger from occurring again. In this computer implemented method, the web bots may be automatically triggered to send requests to social media servers upon creation of a reference web page.

According to still another aspect of the present invention, an exemplary embodiment of a non-transitory computer readable medium, stores a plurality of instructions that when executed by a processor cause the processor to perform a computer implemented method for providing an electronic data review session for review of information regarding performance artists by evaluators of such performance artists. According to the present invention this information has been aggregated, validated and summarized so that the evaluators can effectively evaluate any of the performance artists before them to thereby mitigate any risk in such hiring. In this exemplary embodiment of a non-transitory computer readable medium, the computer implemented method includes: (i) obtaining automatically from performance venue computers performance data from performances at performance venues; (ii) sending by web bots data requests to social media servers for information regarding the performance artists upon creation of a web page for a given performance artist; (iii) parsing received data by web bots received from the social media servers to obtain a predetermined information data set; (iv) storing triggers to collect performance data related to events at performance venues; (v) activating triggers upon occurrence of predetermined conditions; (vi) sending in response to activating triggers predetermined data requests to the performance venue computers; (vii) aggregating and validating data obtained from the social media servers and the performance venue computers to create an overall rating for each performance artist; (viii) serving up interactive web pages to evaluator computers in response to queries from browsers executing on the evaluator computers regarding performance artists; (ix) displaying on interactive web pages information about performance artists; (x) enabling registered evaluators to search for new talent to hire for performances at performance venues by browsing and searching the interactive web pages; (xi) providing a reference web page for each performance artist; (xii) enabling registered evaluators to review details of any performance artists, including a contact information; and (xiii) enabling registered evaluators to search performance artists by overall rating. Furthermore, one or more of the steps set forth in the above computer implemented exemplary embodiment may be included in this embodiment.

Other features and advantages of the present invention will become apparent from the following figures, detailed description, and appended claims.

BRIEF DESCRIPTION OF THE DRAWINGS

FIG. 3 is a diagram depicting the relationships between data sources and the electronic data review system's data collection and processing sub-system.

FIG. 4 is a diagram depicting variable query parameters used with the electronic data review system.

FIG. 5a is a diagram depicting the algorithm used to determine a Facebook® page's strength rating.

FIG. 5d is a diagram depicting the algorithm used to determine the artist's iTunes®, Amazon Music™, rhythmhoüz™ music, and Google Music™ music strength rating.

FIG. 6 depicts an exemplary embodiment of an algorithm used in the systems and methods of the present invention.

DETAILED DESCRIPTION

Figure 1:
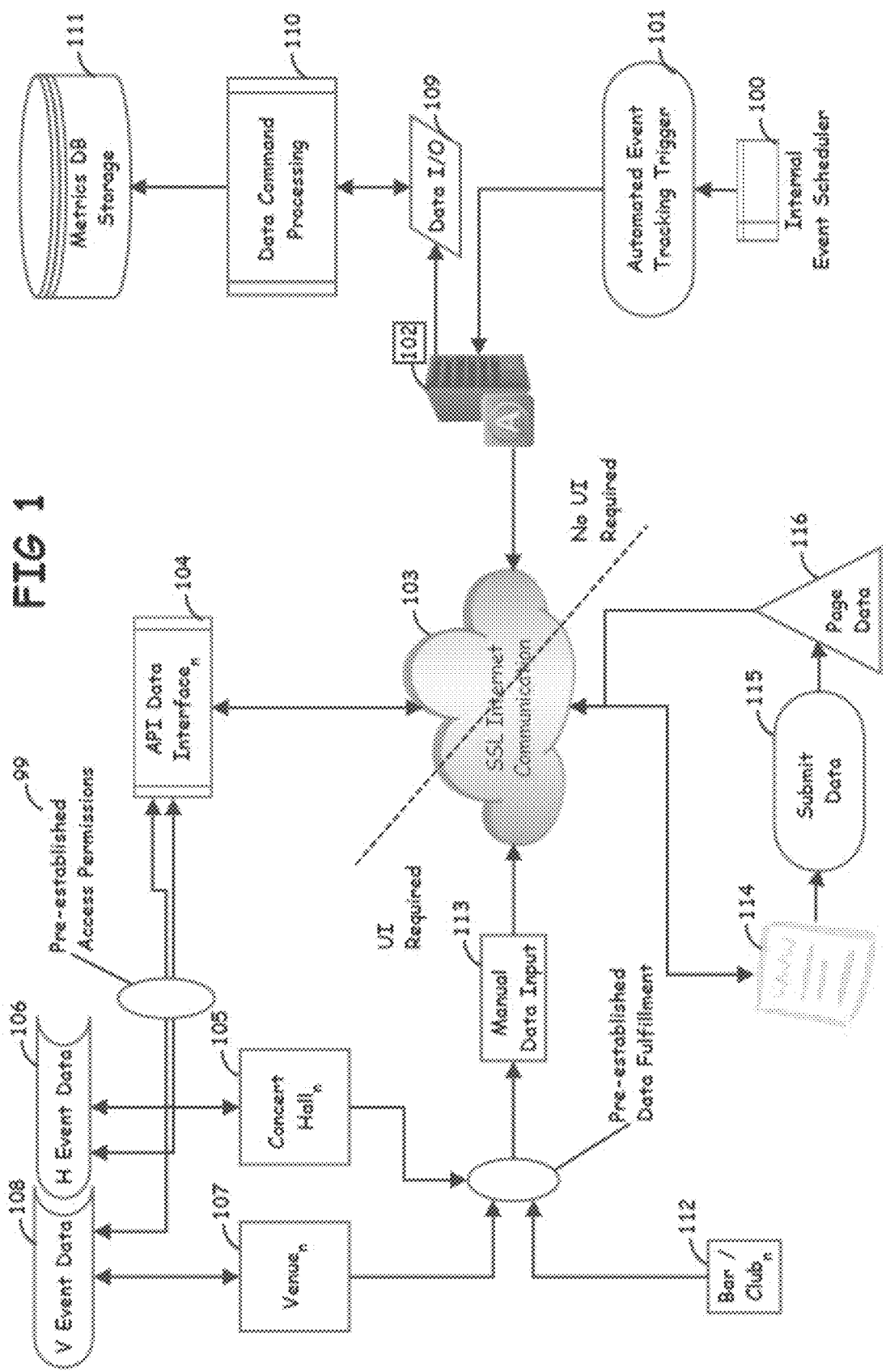
FIG. 1 is a diagram depicting the associated connected relationships between music venues, concert halls, bars/clubs and an electronic data review system for performance data collection.

Referring to FIG. 1, using certificates for authentication and connecting through the hosts firewall, through a secure socket layer (SSL) 103 via the internet and then through the clients firewall which provides token access to the clients database storage by use of the client's API, the host 102 automatically collects metrics and other information from live and historically based performance related data as permissioned by pre-established access agreements 99 to access the data stored at one or more venue types—small/medium/large venues 107, concert halls 107, and bar/clubs 112. The data collected typically represents data associated with ticket sales, attendance and other pertinent metrics collected during an artist or act's performance.

In places that may not have advanced data storage technology in place, and where there isn't an available API to communicate with, to provide for automatic data collection, or where additional data is requested or required, manual data input from a keyboard connected to a computer 113 is used to send the data from a user from within the reporting company, serving under the pre-established agreements to the host's website. Users access the host's website through a secure socket layer (SSL) 103 connection via the internet, and navigate through links and menus to access the web document 114 which contains forms used to collect inputted data by the user referencing performance related data that would normally be collected automatically. Upon completion of entering data on the form(s), the user sends the data to the host by selecting the submit button 115 by clicking or touching the button on their display. This button triggers the web document's javascript(s) to collect and encode the page data and send it through an encrypted secure socket layer (SSL) 103 connection, via the internet, to the host. After which, the host indexes and stores the received data in the metrics database storage for later retrieval by the reporting client as well as other clients.

The host's automatic data collection process is triggered by an internal event scheduler 100 (e.g. calendar, event calendar, crontab, manual process), activating the automated event tracking 101 system. The host 102 and data processing 110, indexes the data received and stored in the metrics database 111, allowing for optimal data retrieval when queries are received from a host client to review a performers historical performance data.

At this point, an introductory overview is presented which may be helpful to place this description of the preferred embodiments in context for the reader.

This technology brings an industry unique method of collecting third party data related to an artist's or act's performance data. This proprietary data is assembled with a combination of artist's social media data and data related to music sales, downloads, plays and measured fan interaction. The resulting data is provided to all venues of similar tier—this proprietary data sharing has never happened between differently owned venues before in the music industry. Previously, the person evaluating an act or artist to hire for a performance would review their internal data and then spend countless hours on social media and music distribution sites, attempting to validate and verify the act or artists claims of the draw they'd bring to the venue. The user, outside of their own internal data, would never be able to review accurate data—only make assumptions based on their findings. The claims in this process provides accurate aggregated data to the user along with quick reference indicators so the user can quickly make an assessment of the caliber of act or artist they're reviewing. The accurate aggregated data allows the user to mitigate the risks associated with hiring an act or artist for a performance.

Figure 2:
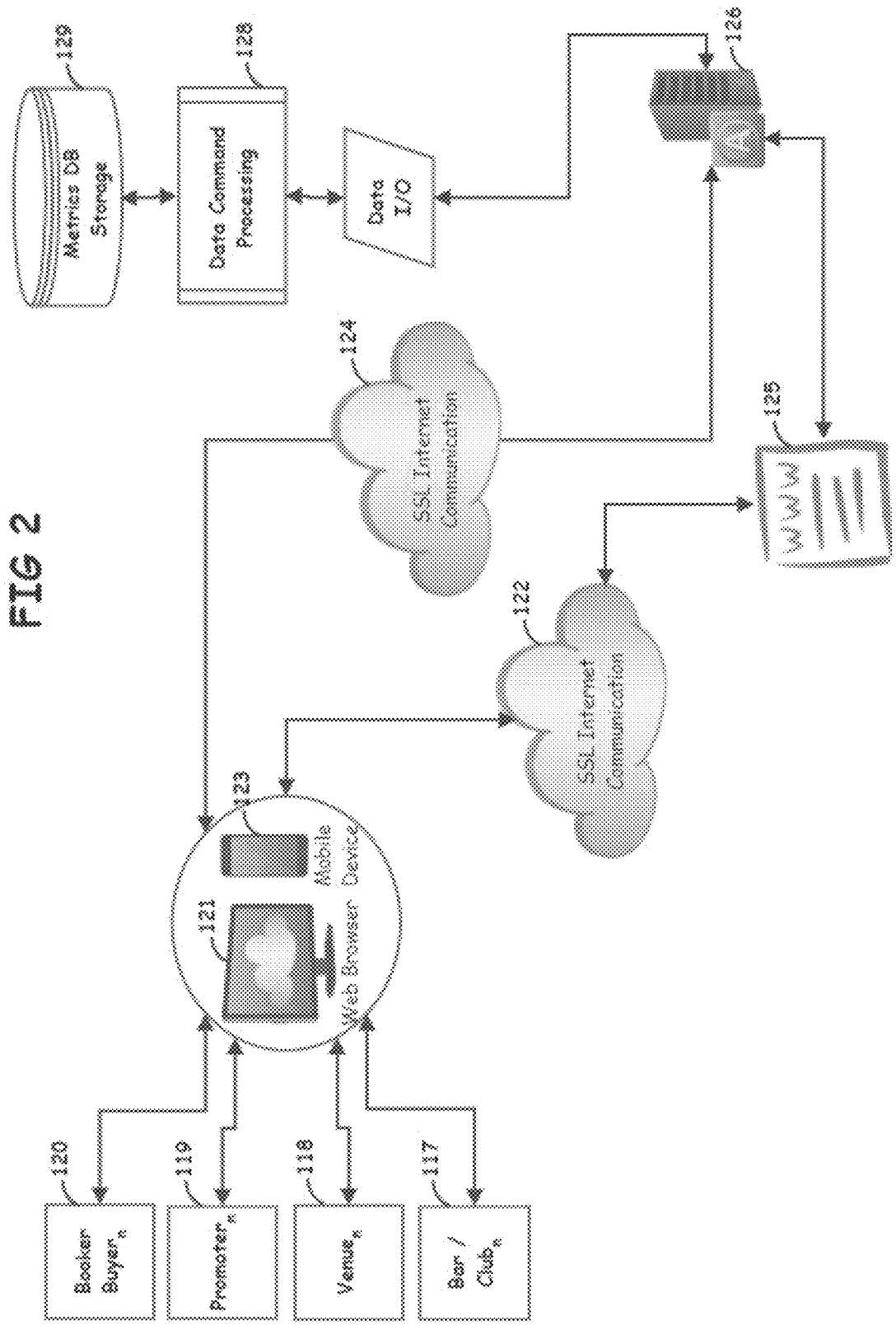
FIG. 2 is a diagram depicting the connected relationships between an EDR system and music venues, concert halls, bars/clubs for the presentation of the performance metrics.

The process of sharing this data with authorized users is presented in FIG. 2.

Referring to FIG. 2, an authorized user, being a booker/buyer 120, promoter 119, venue 118, bar or club 117 and under agreement with the host, using a standard internet web browser 121 or a mobile device application 123, connects to the host's services and is served with web-documents e.g., Hypertext ("HTML") 125 documents or data 126 that populates scripted application documents on a mobile device which forms an interactive online metrics reporting session. This online metrics reporting session is encrypted and secured through a secure socket layer (SSL) 122, 124. After submitting a query in search of acts or artists that meet a certain criteria as defined by the user in session with the EDR, or directly selecting an act or artist to review by a manual review or link provided by an answer to a solicitation issued by the host's client, the user is presented with a brief summary that displays in graphical and textual form, the accurate data that is most commonly used as key indicators and factual data of an artist or act's value and market share. The user has the option to view the long form presentation of the data so they can accurately evaluate what type of a financial impact an act or artist will deliver to the venue, if hired to perform. If the user likes the act or artist's data or is interested in the act or artist to a point that they'd like to review further information, the user can follow links to review media related to the act or artist and/or contact the artist through our services.

Referring to FIG. 3, the host's 131 automatic data collection process is triggered by an internal event scheduler 130 (e.g. calendar, event calendar, crontab, manual process), activating the automated media related collection system. The trigger activates the server 131 to connect through the host's firewall to an encrypted SSL internet communication system 132, and to 7 or more APIs as provided by social media providers 135, audio streaming providers 134, and media distributers 133.

Referring to FIG. 5a, the data extracted 136 from Facebook® includes, but is not limited to the following data: number of posts, total post interaction, number of followers, number of fans, number of events and total attendance from each event. The host's Facebook® page algorithm is used to determine an artist or act's Facebook® page strength as defined by an evaluation through the use of math, current retrieved data from Facebook® and historical data from the host's database. These key data elements are calculated, resulting in the overall act or artist's Facebook® page strength.

Figure 5B:
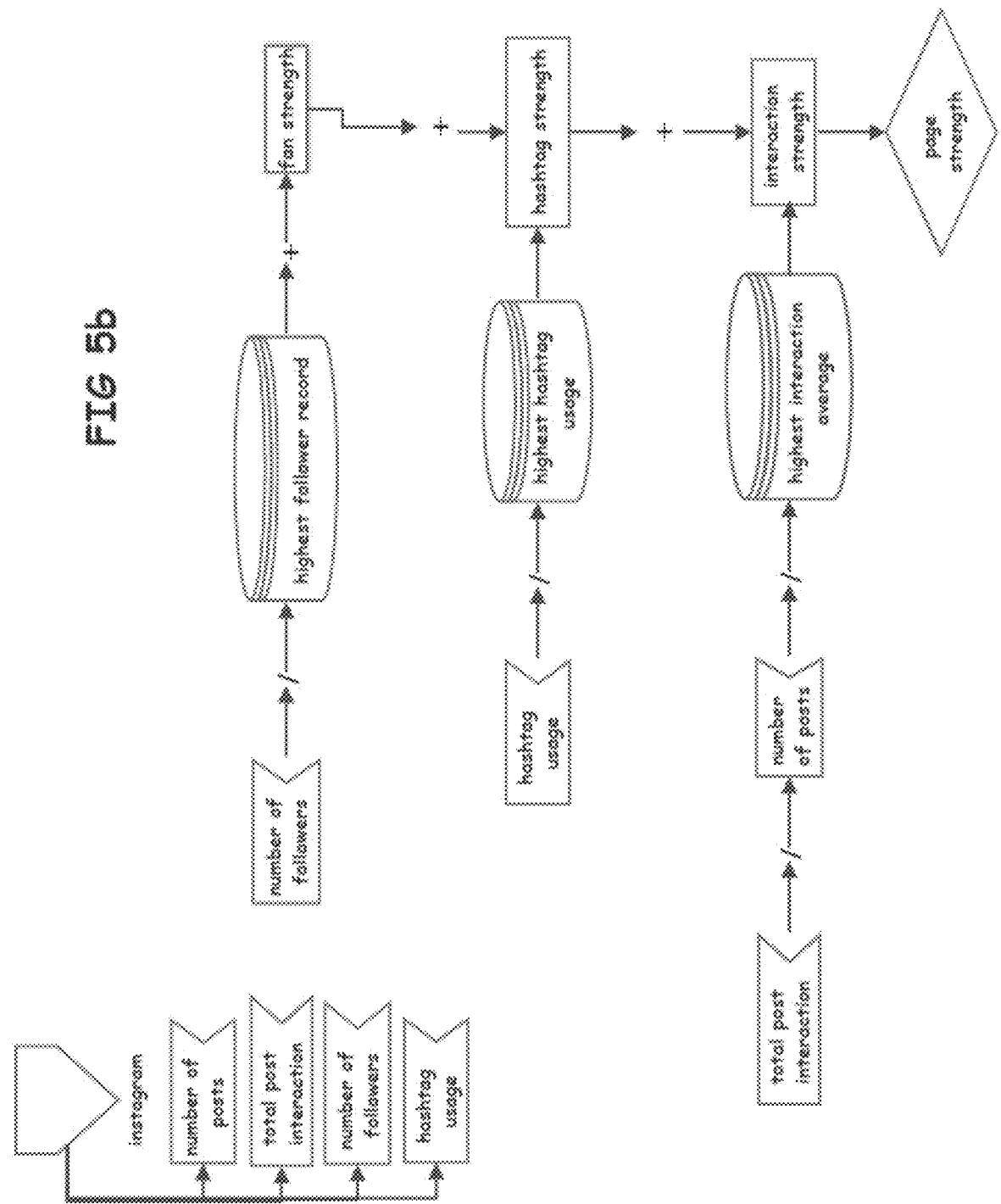
FIG. 5b is a diagram depicting the algorithm used to determine an Instagram™ page's strength rating.

Referring to FIG. 5*b*, the data extracted 136 from Instagram® includes, but is not limited to the following data: number of posts, total post interaction, number of followers, hashtag usage. The host's Instagram® page algorithm is used to determine an artist or act's Instagram® page strength as defined by an evaluation through the use of math, current retrieved data from Instagram® and historical data from the host's database. These key data elements are calculated, resulting in the overall act or artist's Instagram page strength.

Figure 5C:
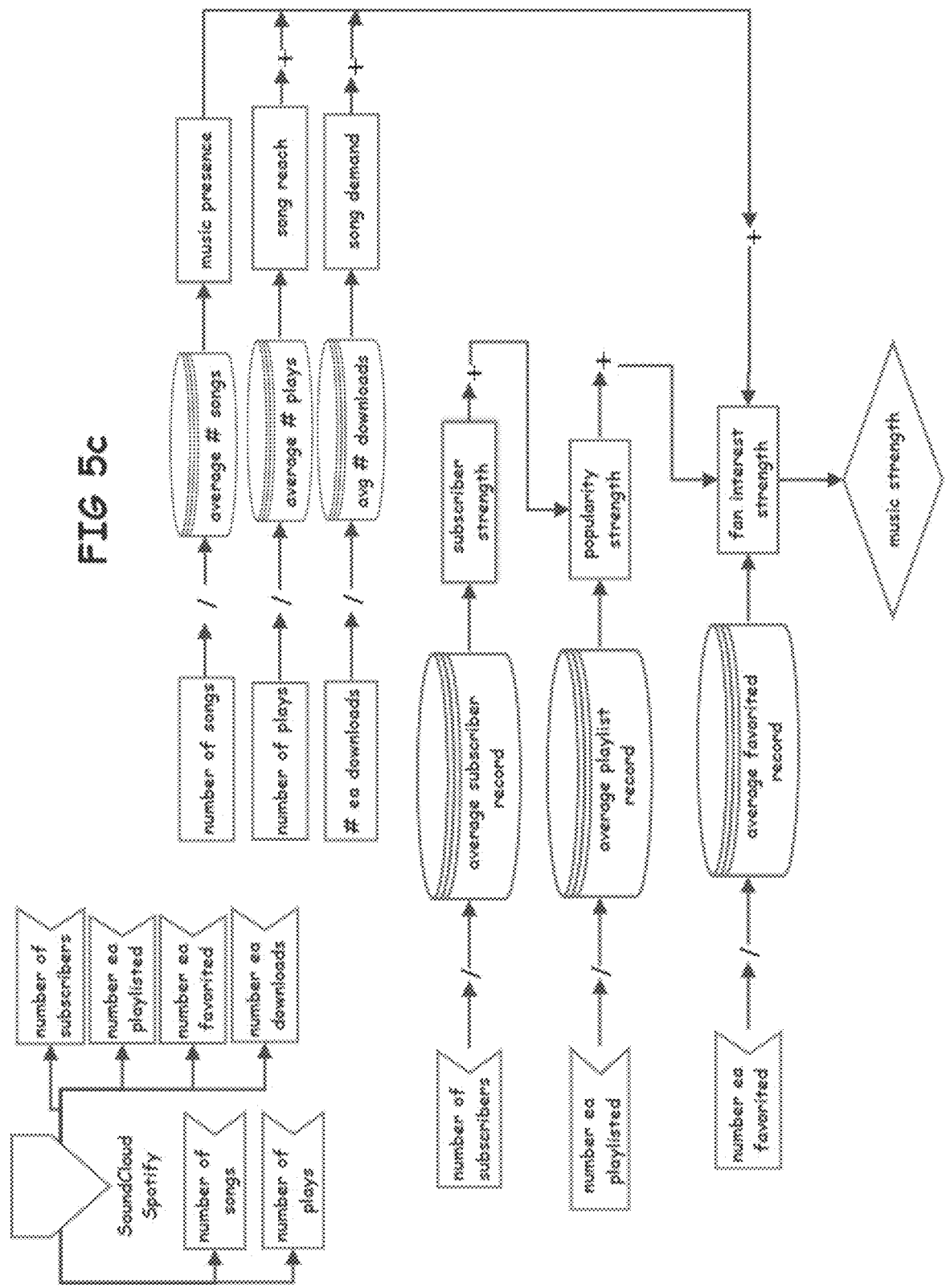
FIG. 5c is a diagram depicting the algorithm used to determine the artist's Soundcloud™ and Spotify™'s account music strength rating.
Figure 5E:
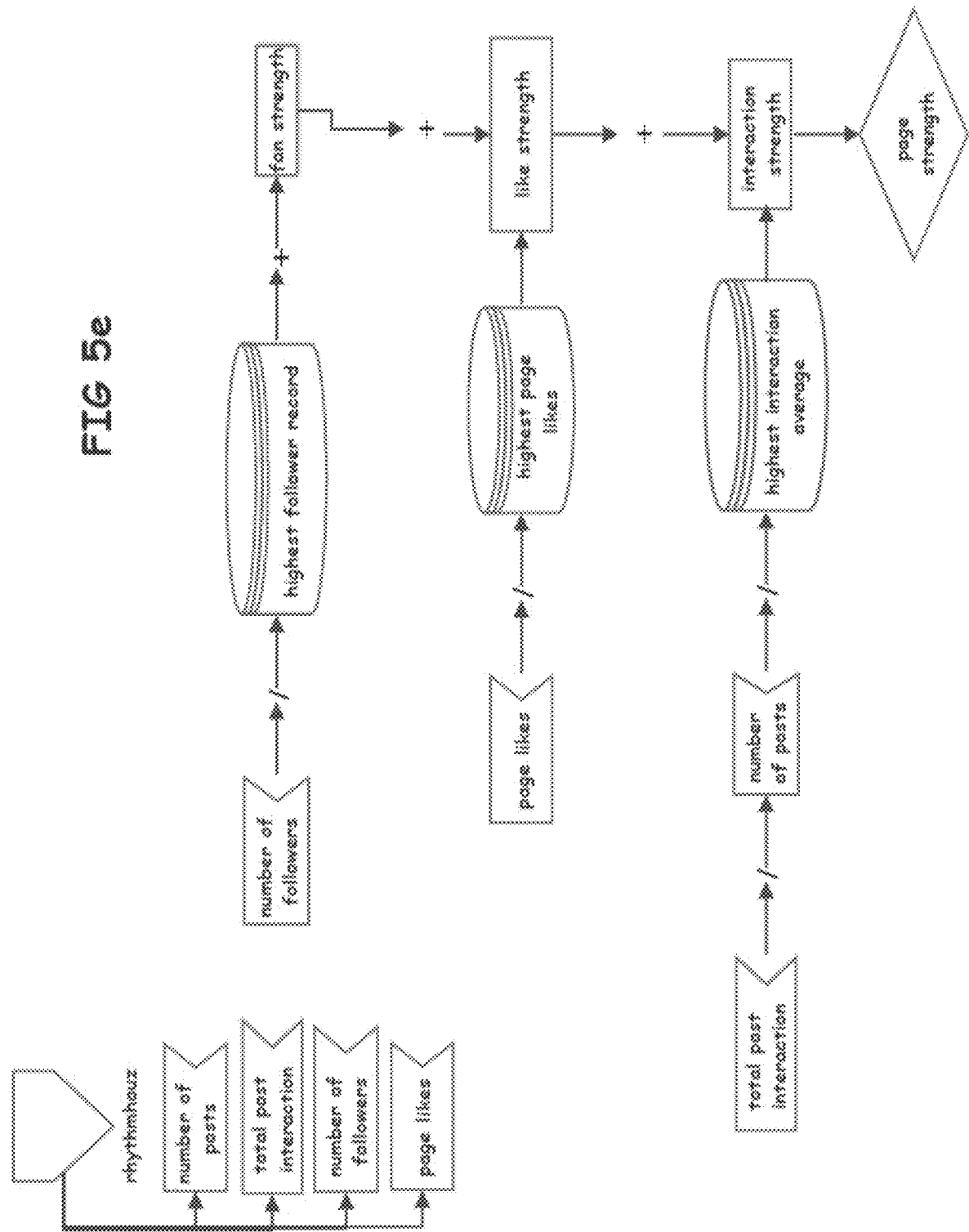
FIG. 5e is a diagram depicting the algorithm used to determine an artist rhythmhoüz™ page's strength rating.

Referring to FIG. 5*e*, the data extracted 136 from rhythmhoüz™ includes, but is not limited to the following data: number of posts, total post interaction, number of followers, number of likes. The host's rhythmhoüz™ page algorithm is used to determine an artist or act's rhythmhoüz™ page strength as defined by an evaluation through the use of math, current retrieved data from rhythmhoüz™ and historical data from the host's database. These key data elements are calculated, resulting in the overall act or artist's Instagram page strength.

Referring to FIG. 5*c*, the data extracted 136 from Soundcloud and Spotify includes, but is not limited to the following data: number of songs, number of plays, number of subscribers, number of each song playlisted, number of each song favorited, and number of each song downloaded. The host's music strength (indicator a.) algorithm is used to determine an artist or act's music strength as defined by an evaluation through the use of math, current retrieved data from these sources and historical data from the host's database related to the collected data. These key data elements are calculated as presented, resulting in the overall act or artist's music strength (indicator a.).

Referring to FIG. 5*d*, the data extracted 136 from iTunes, Amazon Music, rhythmhoüz Music and Google Music includes, but is not limited to the following data: number of songs, number of plays, number of subscribers, number of each song playlisted, number of each song favorited, number of each song downloaded, number of sampled songs and the number of sampled song plays. The host's music strength (indicator b.) algorithm is used to determine an artist or act's music strength as defined by an evaluation through the use of math, current retrieved data from these sources and historical data from the host's database related to the collected data. These key data elements are calculated as presented, resulting in the overall act or artist's music strength (indicator b.). Where API's are not accessible or available, the host uses robots to scrub data from the sources that do not provide API's. The data collected from each of th1ese sources—Social Media 135, Audio Streaming Sites 134, Media Distribution and Library Sites 133 are indexed and sorted 137 and then processed and stored on the host's Metrics database Storage 144.

Fan based and industry professional user actions and user interactions are tracked on the web pages and mobile apps as the user 138 accesses the fan facing side of the act or artist's rhythmhoüz based web page 140 through an SSL (secure) internet connection 139. These actions and interactions are reported to and sorted through the host server's 131 processes. Thereafter, the information in the data command center 143 stores the data in the metrics database 144.

Referring to FIG. 4, using a web browser and connecting via SSL 167 to the host's website 145, an authorized venue has the ability to select filter-based query filter options 147 on the EDR system's query page 146 as provided by the web-documents e.g., Hypertext ("HTML") documents, forming an interactive online metrics reporting session, which is presented on the user's computer using a standard web browser as an EDR. These filters allow an authorized venue to request data that meets a minimum criterion based on the filter(s) used. Where there is a filter that has multiple selections, e.g. arenas played 161, a "drop down" type of data container is used in the html type web document to provide for a single value of the filter selected. Otherwise, an html-based checkbox is used as a selector in the form. The filters as listed are not limited to this specific list and may include additional or less filters depending on the varying scope of data collected for the type of query the authorized venue is submitting. These filters are listed as follows: filter 148—"date of event" which implies the date of the event—in the case where data for a specific event is requested; filter 149—"tier level (sort based)"—when selected will present a "drop down" data container, presenting the most current tiers that acts or artists are rated at—allowing the query to return only specific caliber artist or acts based on a minimum tier. Current tiers are based on, but not limited to, overall ratings provided for an act or artist through an algorithm (see FIG. 6) that considers the fan draw, popularity, performance stats and other accurate and calculated data derived from the sources listed previously in this claim document. Filter 150—"draw" will return the audience draw or historical average attendance based on a selected regional value of "national", "regional" and "local". Filter 151—"market diversity" provides insight to the act or artists ability to crossover genres. Filter 152—"fan impressions" is derived from the actual count a music fan has viewed the act or artists rhythmhoüz web-fan facing page. Filter 153—"headline vs support plays" presents the number of times an act or artist has either headlined a show/performance or opened up as a supporting act for another act or artist. Filter 154—"radio charting" if the act or artist has radio 'air-time', this option displays where their music is currently and historically charting based on highest and lowest charting. Filter 155—"internet radio charting" if the act or artist has internet radio plays, this option displays where their music is currently and historically charting based on highest and lowest charting. Filter 156 "airplay report" shows the historical statistics regarding the highest amount of song plays, based on a "national", "regional" or "local" level. Filter 157—"avg ticket price" displays the average ticket price sold for a performance by the act or artist. Filter 158—"avg ticket number sold" displays the average number of tickets the act or artist has sold for a performance they either headlined or supported another act or artist in. Filter 159 "# historical records" returns the amount of performances that recorded data is entered in rhythmhoüz™'s databases. Filter 160 "market share" compares the fan base, interaction and attendance at performances with other acts and artists on a "national", "regional" and "local" level. Filter 161 "arenas played" displays historical data regarding the venues—whether they are a club, a bar, a small/medium/large venue, a concert hall of any size or an arena of a given seating size. The data is returned based on seating number filter where a user would select one of the following to return the requested data: "over 20K seats", "10K—20K seats", "4K—10K seats", "2K—4K seats", "800-2K seats", "400-800 seats", "150-400 seats", and "under 150 seats". Filter 162—"reliability" is reported by the host's clients after an act or artist's performance and rates the reliability of the act and artist based on expectations by the venue and interaction with the staff. Filter 163—"beverage rating" is reported by the host's clients after an act or artist's performance and rates the experience of the bar at the venue as a star rating—from poor (0 stars) to excellent (10 stars). Filter 164—"social media reports" reports the overall page strength rating depicted on FIG. 5*a*, FIG. 5*b* and FIG. 5*e*. Filter 165—"music dist. reports" reports the overall music strength rating depicted on FIG. 5*c* and FIG. 5*d*.

FIG. 6 considers the fan draw, popularity, performance stats, recording sales, streams, charting and other accurate and calculated data derived from the sources listed previously in this claim document. By using this algorithm, the data extracted in FIG. 4, 136 by Filters 154, 155, 156 to create a "Song Charting" report AND Filter 168 "RIAA reporting", can be used to determine an industry related tier level as calculated by using math and comparing their RIAA and charting related statistics to a tier level average. The data provided by the "strength" results in FIG. 5*a*, FIG. 5*b*, FIG. 5*c*, FIG. 5*d* and FIG. 5*e* are used in combination with a calculation of the data collected in FIG. 1, FIG. 3 and FIG. 4 to summarize an overall performance strength that is used to calculate the tier rating of a recording artist or performing artist. Additional sources used in this algorithm are from a rhythmhoüz database storing metrics which may or may not contain previous tier ranges and rhythmhoüz database data relating to venue reported data, 111.

The various steps and processes described above can be implemented in a wide variety of configurations and architectures. Therefore, some or all of the operations in the preceding embodiments may be performed in hardware, software or in some combination of both. In some embodiments, a tangible apparatus or article of manufacture comprising a tangible computer useable or readable medium having control logic (e.g., software) stored thereon is also referred to herein as a computer program product or program storage device, as well as tangible articles of manufacture embodying any combination of the foregoing. Such control logic, when executed by one or more data processing devices causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in the figures. In particular, embodiments may operate with software, hardware, and/or operating system implementations other than those described herein.

While the disclosure has been described herein with reference to exemplary embodiments for exemplary fields and applications, it should be understood that the disclosure is not limited thereto. Other embodiments and modifications thereto are possible and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware or may be implemented in a form of a software functional unit.

When the integrated unit is implemented in the form of a software functional unit and sold or used as an independent product, the integrated unit may be stored in a computer-readable storage medium. Based on such an understanding, the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely example implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The breadth and scope of the disclosure should not be limited by any of the above-described exemplary embodiments, but should be defined only in accordance with the following claims and their equivalents.

What is claimed is:

1. An apparatus for providing an electronic data review session for review of information regarding one or more performance artists by one or more evaluators, which information has been aggregated, validated and summarized so that said one or more evaluators can effectively evaluate any of said one or more performance artists before hiring any of said one or more performance artists to thereby mitigate any risk in hiring any of said one or more performance artists, said a pparatus comprising:

a host server for communicating with one or more user computers, one or more social media web servers, one or more music streaming servers, and one or more performance venue computers, wherein each of said one or more user computers can display information to each of one or more users via one or more browsers operating on said each of said one or more user computers;

a database storing information regarding one or more performance artists, and in combination with said host server serving up one or more interactive web pages to any of said one or more user computers in response to one or more queries from said one or more browsers regarding said one or more performance artists;

said one or more interactive web pages including information about one of the one or more performance artists;

said database and server combination interacting with each of the one or more browsers being executed on the one or more user computers to display said one or more interactive web pages to enable said user to search for new talent to hire for one or more performances at one or more performance venues;

said one or more interactive web pages include an electronic data review system query page having a plurality of user selectable filters to enable said user to search for new talent by selecting one or more of the plurality of user selectable filters;

said database and server combination providing a reference web page for each of said one or more performance artists;

said database and server combination enabling a user to review details of any of said one or more performance artists, including a contact information;

one or more performance venue application programming interfaces (APIs) via which said host server communicates with said one or more performance venues through which said host server obtains live and historical performance data from performances at said one or more performance venues;

said database storing one or more historical records of performance artist performance data as reported by one or more performance venues via said one or more performance venue APIs, said one or more historical records of performance artist performance data including ticket price, ticket sales, ticket scans, and attendance;

one or more social media application programming interfaces (APIs) via which said host server automatically obtains social media data regarding said performance artists from said one or more social media web servers, said social media data regarding said performance artists including number of likes, followers, posts, likes on posts, and comments on posts;

one or more music streaming service application programming interfaces (APIs) via which said host server automatically obtains music data regarding said performance artists from the one or more music streaming servers, said music data regarding said performance artists including number of songs, number of plays, number of subscribers, number of playlists, number of favorites, and number of downloads;

one or more web bots to request said social media data from said one or more social media websites by sending one or more requests to said one or more social media web servers, said one or more web bots then parsing received data from the one or more web social media servers to obtain a predetermined social media information dataset;

one or more web bots to request music data from one or more music streaming websites by sending one or more requests to said one or more music streaming servers, said one or more web bots then parsing received data from the one or more music streaming servers to obtain a predetermined music information dataset;

an automated data collection and retrieval system to access stored and live data through said one or more performance venue APIs by sending one or more predetermined data requests to the one or more performance venue APIs based upon one or more predetermined conditions;

a digital event calendar storing one or more events regarding one or more performances at said one or more performance venues and storing one or more triggers to collect performance data related to the one or more events;

a processor coupled to said database and said host server aggregating and validating data obtained via said one or more social media APIs and said one or more performance venue APIs to create an overall rating for each of said one or more performance artists;

said processor calculating said overall rating by: (i) determining a social media page strength value for one or more social media sites; (ii) determining a music strength value based on one or more music streaming sites; (iii) determining a performance strength value; (iv) determining an attendance strength value; (v) determining a draw strength value; (vi) determining a reliability strength value; and (vii) summing the social media page strength value, the music strength value, the performance strength value, the attendance strength value, the draw strength value; and the reliability strength value to obtain an overall strength value; and said overall rating being displayed on said reference web page for each of said one or more performance artists;

wherein an occurrence of a particular event at a particular performance venue stored on the digital event calendar activates one of the one or more triggers, each of which causes the automated data collection and retrieval system to send said one or more predetermined data requests to a particular performance venue API related to the particular performance venue; and said automated data collection and retrieval system automatically determining if a particular performance venue does not have a performance venue API upon receipt of said particular one of the one or more triggers occurs and sending an email to the performance venue with a link to a predetermined website at which a data collection form can be downloaded so the particular performance venue can manually input any required data using the data collection form; and upon receipt of a completed data collection form for a particular performance event, the server sends a notification to the digital event calendar, which removes the particular one of the one or more triggers and prevents the particular one of the one or more triggers from repeating.

2. The apparatus according to claim 1, wherein said one or more predetermined conditions includes one of the one or more events stored on the digital event calendar.

3. The apparatus according to claim 1, wherein said one or more predetermined data requests include one or more of the following: a jQuery, an AJAX, a fetch, and an XMLHttpRequest GET/POST to request JSON, text or SQL data.

4. The apparatus according to claim 1, wherein the web bots are automatically triggered to send said one or more requests to said one or more social media web servers upon creation of each of the reference web pages.

5. The apparatus according to claim 1, wherein said plurality of user selectable filters include: (i) date of event; (ii) tier level; (iii) draw; (iv) market diversity; (v) fan impressions; (vi) headline versus support plays; (vii) radio charting; (viii) internet radio charting; (ix) airplay reports; (x) average ticket price; (xi) average ticket number sold; (xii) historical records; (xiii) market share; (xiv) arenas played; (xv) reliability; (xvi) beverage rating; (xvii) social media reports; (xviii) music distribution reports; and (xix) RIAA reports.

6. The apparatus according to claim 5, wherein said plurality of user selectable filters further include: (i) national draw; (ii) regional draw; and (iii) local draw; (iv) national airplay reports; (v) regional airplay reports; (vi) local airplay reports; (vii) national market share; (viii) regional market-share; (ix) local market share; and (x) arena size specific.

7. The method according to claim 5, wherein said plurality of user selectable filters further include: (i) national draw; (ii) regional draw; and (iii) local draw; (iv) national airplay reports; (v) regional airplay reports; (vi) local airplay reports; (vii) national market share; (viii) regional market-share; (ix) local market share; and (x) arena size specific.

8. The apparatus according to claim 1, wherein the processor determines the social media strength value by analyzing a number of followers, a number of posts, a number of fans, a number of events, a total attendance, a total post interaction, a hashtag usage, a fan variance and a fan adjustment.

9. The apparatus according to claim 1, wherein the processor determines the music strength value by: (i) analyzing for each of said plurality of music streaming sites, the number of songs, the number of plays, the number of subscribers, a number of playlisted songs, a number of favorited songs, a number of downloaded songs, a number of sampled songs, and a number of sampled plays to determine a subscriber strength, a popularity strength, and a fan interest strength; (ii) summing said subscriber strength, popularity strength and fan interest strength to obtain a site specific music strength value for said each of the plurality of music streaming sites; and (iii) adding the site specific music strength value for each of the plurality of music streaming sites to obtain said music strength value.

10. A computer implemented method for providing an electronic data review session for review of information regarding one or more performance artists by one or more evaluators, which information has been aggregated, validated and summarized so that said one or more evaluators can effectively evaluate any of said one or more performance artists before hiring any of said one or more performance artists to thereby mitigate any risk in hiring any of said one or more performance artists, said computer implemented method comprising:

communicating from a server with one or more user computers, with one or more social media web servers and one or more performance venue computers, wherein each of said one or more user computers can display information to each of one or more users via one or more browsers operating on said each of said one or more user computers;

storing information in a database regarding one or more performance artists;

serving up one or more interactive web pages to any of said one or more user computers in response to one or more queries from said one or more browsers regarding said one or more performance artists;

displaying on each of said one or more interactive web pages information about one of the one or more performance artists;

interacting with each of the one or more browsers being executed on the one or more user computers to display said one or more interactive web pages to enable said user to search for new talent to hire for one or more performances at one or more performance venues;

providing a reference web page for each of said one or more performance artists;

enabling a user to review details of any of said one or more performance artists, including a contact information;

communicating via one or more performance venue application programming interfaces (APIs) with said one or more performance venue computers to automatically obtain live and historical performance data from performances at said one or more performance venues;

storing one or more historical records of performance artist performance data as reported by one or more performance venue computers via said one or more performance venue APIs, said one or more historical records of performance artist performance data including ticket price, ticket sales, ticket scans, and attendance;

communicating via one or more social media application programming interfaces (APIs) to automatically obtain social media data regarding said performance artists from said one or more social media web servers, said social media data regarding said performance artists including number of likes, followers, posts, likes on posts, and comments on posts;

communicating via one or more music streaming service application programming interfaces (APIs) to automatically obtain music data regarding said performance artists from one or more music streaming servers, said music data regarding said performance artists including number of songs, number of plays, number of subscribers, number of playlists, number of favorites, and number of downloads;

requesting by one or more web bots said social media data from said one or more social media websites by sending one or more requests to said one or more social media web servers;

requesting by one or more web bots said music data from said one or more music streaming servers by sending one or more requests to said one or more music streaming servers;

parsing received said social media data by one or more web bots received from the one or more social media web servers and the music data by the one or more web bots received from the one or more music streaming servers to obtain a predetermined information data set;

accessing stored and live data through said one or more performance venue APIs by sending one or more predetermined data requests to the one or more performance venue APIs based upon one or more predetermined conditions;

storing in a digital event calendar one or more events regarding one or more performances at said one or more performance venues;

storing one or more triggers to collect performance data related to the one or more events; aggregating and validating data obtained via said one or more social media APIs and said one or more performance venue APIs to create an overall rating for each of said one or more performance artists; and displaying said overall rating on said reference web page for each of said one or more performance artists;

calculating said overall rating by: (i) determining a social media page strength value for one or more social media sites; (ii) determining a music strength value based on one or more music streaming sites; (iii) determining a performance strength value; (iv) determining an attendance strength value; (v) determining a draw strength value; (vi) determining a reliability strength value; and (vii) summing the social media page strength value, the music strength value, the performance strength value, the attendance strength value, the draw strength value; and the reliability strength value to obtain an overall strength value;

and performing a user specified search for newtalent in response to a user initiated query entered via an electronic data review system query page having a plurality of user selectable filters to enable a user to search for new talent by selecting one or more of the plurality of user selectable filters:

wherein upon an occurrence of a particular event ata particular performance venue stored on the digital event calendar:

activating one of the one or more triggers, each of which causes the automated data collection and retrieval system to send said one or more predetermined data requests to a particular performance venue API related to the particular performance venue; and wherein if a particular performance venue does not have a performance venue API when a particular one of the one or more triggers is activated:

sending automatically an email to the performance venue with a link to a predetermined website at which a data collection form can be downloaded so the particular performance venue can manually input any required data using the data collection form; and sending a notification, upon receipt of a completed data collection form for a particular performance event, to the digital event calendar; and removing the particular one of the one or more triggers to prevent the particular one of the one or more triggers from repeating.

11. The method according to claim 10, wherein said one or more predetermined conditions includes one of the one or more events stored on the digital event calendar.

12. The method according to claim 10, wherein said one or more predetermined data requests include one or more of the following: a jQuery, an AJAX, a fetch, and an XMLHttpRequest GET/POST to request JSON, text or SQL data.

13. The method according to claim 10, further comprising: triggering automatically the web bots to send said one or more requests to said one or more social media web servers upon creation of each of the reference web pages.

14. The method according to claim 13, wherein said plurality of user selectable filters include: (i) date of event; (ii) tier level; (iii) draw; (iv) market diversity; (v) fan impressions; (vi) headline versus support plays; (vii) radio charting; (viii) internet radio charting; (ix) airplay reports; (x) average ticket price; (xi) average ticket number sold; (xii) historical records; (xiii) market share; (xiv) arenas played; (xv) reliability; (xvi) beverage rating; (xvii) social media reports; (xviii) music distribution reports; and (xix) RIAA reports.

15. The method according to claim 10, wherein the processor determines the social media strength value by analyzing a number of followers, a number of posts, a number of fans, a number of events, a total attendance, a total post interaction, a hashtag usage, a fan variance and a fan adjustment.

16. The method according to claim 10, wherein the processor determines the music strength value by: (i) analyzing for each of said plurality of music streaming sites, the number of songs, the number of plays, the number of subscribers, a number of playlisted songs, a number of favorited songs, a number of downloaded songs, a number of sampled songs, and a number of sampled plays to determine a subscriber strength, a popularity strength, and a fan interest strength; (ii) summing said subscriber strength, popularity strength and fan interest strength to obtain a site specific music strength value for said each of the plurality of music streaming sites; and (iii) adding the site specific music strength value for each of the plurality of music streaming sites to obtain said music strength value.

17. A non-transitory computer readable medium storing a plurality of instructions that when executed by a processor cause the processor to perform a computer implemented method for providing an electronic data review session for review of information regarding one or more performance artists by one or more evaluators, which information has been aggregated, validated and summarized so that said one or more evaluators can effectively evaluate any of said one or more performance artists before hiring any of said one or more performance artists to thereby mitigate any risk in hiring any of said one or more performance artists, said computer implemented method comprising:

obtaining automatically from one or more performance venue computers performance data from performances at said one or more performance venues, said data from performances at said one or more performance venues including ticket price, ticket sales, ticket scans, and attendance;

sending by one or more web bots one or more data requests to said one or more social media web servers for information regarding the one or more performance artists upon creation of a web page for a given performance artist, said information regarding the one or more performance artists including number of likes, followers, posts, likes on posts, and comments on posts;

sending by one or more web bots one or more requests for music data to one or more music streaming servers for information regarding the one or more performance artists, said music data including number of songs, number of plays, number of subscribers, number of playlists, number of favorites, and number of downloads;

parsing received data by said one or more web bots received from the one or more social media web servers and the one or more music streaming servers to obtain a predetermined information data set;

storing one or more triggers to collect performance data related to one or more events at one or more performance venues;

activating said one or more triggers upon occurrence of one or more predetermined conditions;

sending in response to said activating one or more predetermined data requests to the one or more performance venue computers;

aggregating and validating data obtained from the one or more social media web servers, the music streaming servers, and the one or more performance venue computers to create an overall rating for each of said one or more performance artists;

serving up one or more interactive web pages to any of one or more evaluator computers in response to one or more queries from one or more browsers executing on the one or more evaluator computers regarding one or more performance artists;

displaying on each of said one or more interactive web pages information about one of the one or more performance artists;

enabling one or more registered evaluators to search for new talent to hire for one or more performances at one or more performance venues by browsing and searching the one or more interactive web pages;

performing a user specified search for new talent in response to a user initiated query entered via an electronic data review system query page having a plurality of user selectable filters to enable a user to search for new talent by selecting one or more of the plurality of user selectable filters;

providing a reference web page for each of said one or more performance artists;

enabling one or more registered evaluators to review details of any of said one or more performance artists, including a contact information; and enabling one or more registered evaluators to search performance artists by said overall rating for each of said one or more performance artists:

wherein upon an occurrence of a particular event at a particular performance venue stored on the digital event calendar:

activating one of the one or more triggers, each of which causes an automated data collection and retrieval system to send said one or more predetermined data requests to a particular performance venue API related to the particular performance venue; and wherein if a particular performance venue does not have a performance venue API when a particular one of the one or more triggers is activated:

sending automatically an email to the performance venue with a link to a predetermined website at which a data collection form can be downloaded so the particular performance venue can manually input any required data using the data collection form; and sending a notification, upon receipt of a completed data collection form for a particular performance event, to the digital event calendar; and removing the particular one of the one or more triggers to prevent the particular one of the one or more triggers from repeating, calculating said overall rating by: (i) determining a social media page strength value for one or more social media sites; (ii) determining a music strength value based on one or more music streaming sites; (iii) determining a performance strength value; (iv) determining an attendance strength value; (v) determining a draw strength value; (vi) determining a reliability strength value; and (vii) summing the social media page strength value, the music strength value, the performance strength value, the attendance strength value, the draw strength value; and the reliability strength value to obtain an overall strength value.

18. The non-transitory computer readable medium according to claim 17, wherein said one or more predetermined conditions includes one of the one or more events stored on the digital event calendar.

19. The non-transitory computer readable medium according to claim 17, wherein said one or more predetermined data requests include one or more of the following: a jQuery, an AJAX, a fetch, and an XMLHttpRequest GET/POST to request JSON, text or SQL data.

20. The non-transitory computer readable medium according to claim 17, further comprising: triggering automatically the web bots to send said one or more requests to said one or more social media web servers upon creation of each of the reference web pages.

* * * * *